United States Patent
Matthews et al.

(10) Patent No.: US 10,790,557 B2
(45) Date of Patent: Sep. 29, 2020

(54) METHODS AND SYSTEMS FOR ELECTRIC TURBO

(71) Applicant: Ford Global Technologies, LLC, Dearborn, MI (US)

(72) Inventors: Patrick Matthews, West Bloomfield, MI (US); Chee Haw Chan, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 336 days.

(21) Appl. No.: 15/838,167

(22) Filed: Dec. 11, 2017

(65) Prior Publication Data

US 2019/0181513 A1     Jun. 13, 2019

(51) Int. Cl.
| | |
|---|---|
| *H01M 10/613* | (2014.01) |
| *H01M 10/625* | (2014.01) |
| *H01M 10/65* | (2014.01) |
| *F02B 37/10* | (2006.01) |
| *F02B 39/10* | (2006.01) |
| *F02B 37/14* | (2006.01) |

(52) U.S. Cl.
CPC ........... *H01M 10/613* (2015.04); *F02B 37/10* (2013.01); *F02B 37/14* (2013.01); *F02B 39/10* (2013.01); *H01M 10/625* (2015.04); *H01M 10/65* (2015.04); *F05D 2220/40* (2013.01); *F05D 2220/76* (2013.01); *H01M 2220/20* (2013.01)

(58) Field of Classification Search
CPC .. H01M 10/613; H01M 10/625; H01M 10/65; H01M 2220/20; F02B 37/10; F02B 39/10; F02B 37/14; F05D 2220/40; F05D 2220/76; F05D 2220/6556; H01B 7/423; H01B 7/425; H01B 7/29
See application file for complete search history.

(56) References Cited

U.S. PATENT DOCUMENTS

| | | | |
|---|---|---|---|
| 7,375,406 | B2 | 5/2008 | Lamb et al. |
| 9,431,730 | B2 | 8/2016 | Oda et al. |
| 9,518,505 | B2 | 12/2016 | Matthews et al. |
| 2006/0123783 | A1 | 6/2006 | Philippe |
| 2009/0016911 | A1 | 1/2009 | Noelle |

*Primary Examiner* — Laert Dounis
*Assistant Examiner* — Edward Bushard
(74) *Attorney, Agent, or Firm* — Geoffrey Brumbaugh; McCoy Russell LLP

(57) ABSTRACT

Methods and systems are provided for an electric turbocharger power lead. In one example, a system may include a conduit comprise at least one coolant jacket surrounding a passage housing a set of electric leads extending from an energy storage device to the electric turbocharger.

13 Claims, 5 Drawing Sheets

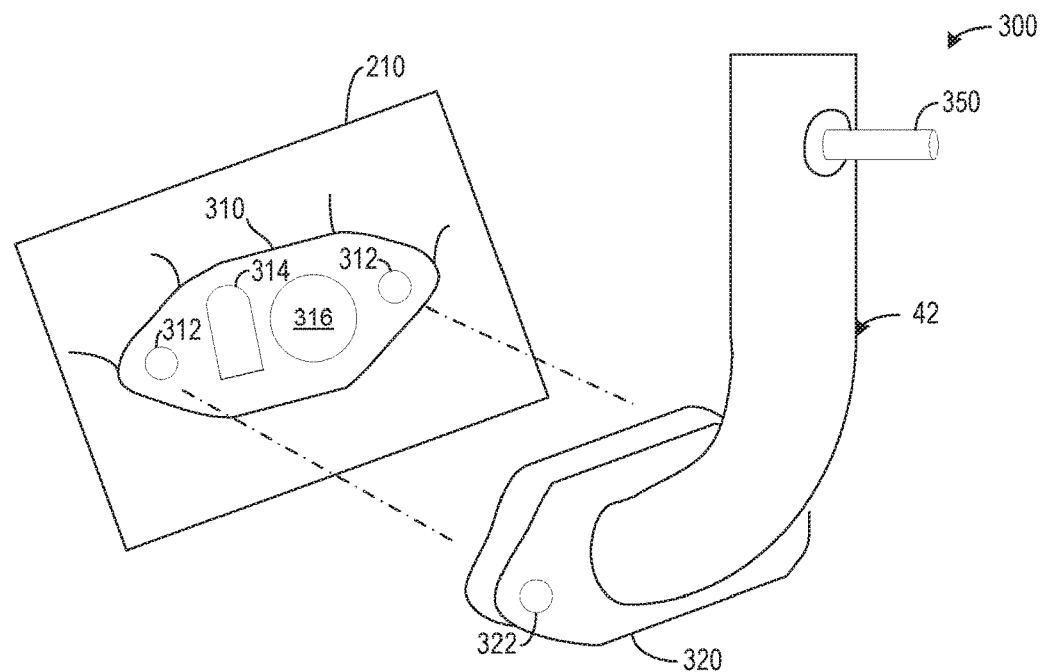
FIG. 3
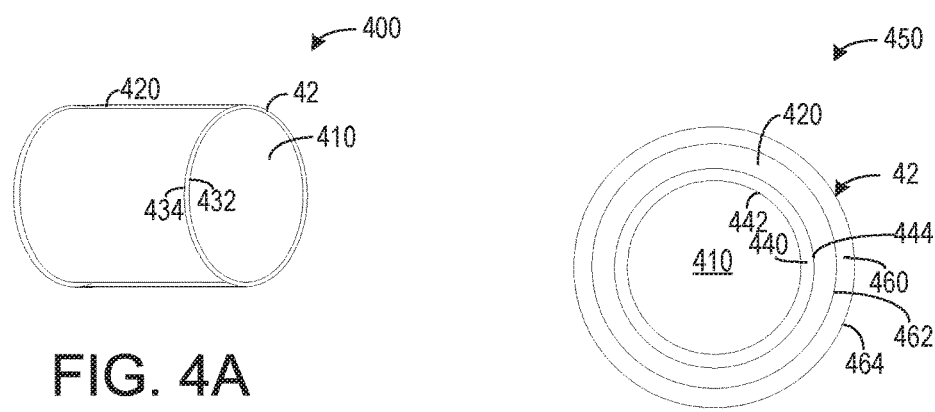
FIG. 4A
FIG. 4B
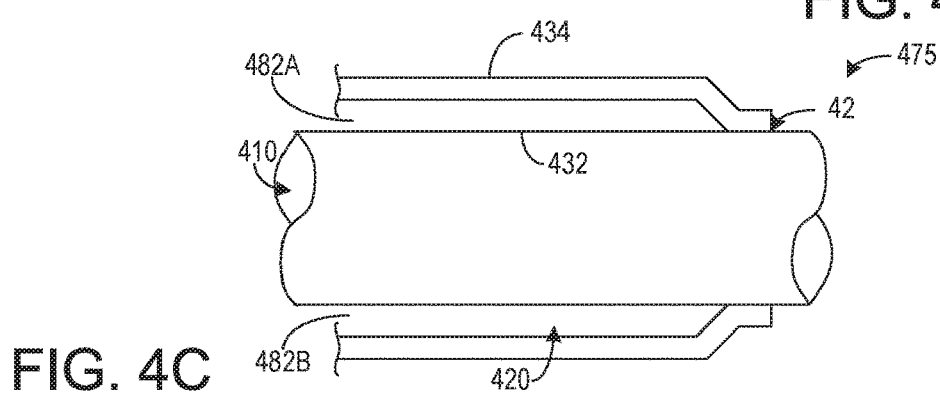
FIG. 4C

METHODS AND SYSTEMS FOR ELECTRIC TURBO

FIELD

The present description relates generally to leads coupled to an electric turbo and a coolant jacket associated with the leads.

BACKGROUND/SUMMARY

Internal combustion engines may be fitted with a turbocharger to increase engine performance. The turbocharger may utilize exhaust gas energy from the engine to drive a turbine which is mechanically coupled to the engine. The compressor may compress inlet air, which may increase an engine power output, as exhaust gases flow through the turbine. However, this compression is dependent on exhaust gas flow and may be below a desired compression at low engine speeds or other engine conditions where exhaust gas output may be low. This may be referred to as "turbo lag".

The compressor may be fitted with an electric motor to power the compressor to provide a desired amount of compression when exhaust gas flow is insufficient. Thus, the electric motor may increase engine power output during transient conditions when exhaust gas flow is too low to sufficiently spin the turbine.

There may be some difficulties when using electric turbines. For example, due to packaging restraints, leads extending from a power source to the electric motor of the compressor may be close in proximity to an exhaust manifold and/or turbine housing, which may result in a relatively high temperature environment. As a further result of the packaging restraints, components of the engine are positioned relatively close to one another and may increase an assembling difficulty. Lastly, a degree of water-tightness may be desired to prevent current leakage between one or more leads.

In one example, the issues described above may be addressed by a system comprising an electric turbocharger housing comprising at least an electric motor, and where the electric turbocharger receives and expels coolant via first and second passages housed within a conduit, the first and second passages surrounding a set of leads extending through the conduit to the electric turbocharger. In this way, the relatively high temperatures of the surrounding exhaust gas device environment may not degrade the leads extending to the electric turbocharger.

As one example, the set of leads may be arranged in a hollow passage of the conduit, and where the first and second passages are fluidly separated from the hollow passage. The conduit may be flexible and wrap around a turbine or an exhaust manifold. The electric turbocharger may comprise a first gasket and the conduit may comprise a second gasket configured to mate with the first gasket. The first and second gaskets comprise coolant ports and electrical ports, the coolant ports configured to adjust coolant flow between the electric turbocharger and the first and second passages, and where the electric ports are configured to direct the set of leads from the conduit to a conductor of the electric turbocharger. In this way, the conduit may escort the electric leads from the battery to the electric turbocharger while preventing overheating of the leads.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 illustrates an embodiment of a conduit comprising coolant passages and a set of leads.

FIGS. 4A, 4B, and 4C show various schematic views of the conduit.

FIGS. 3-5 are shown approximately to scale.

DETAILED DESCRIPTION

Figure 1:
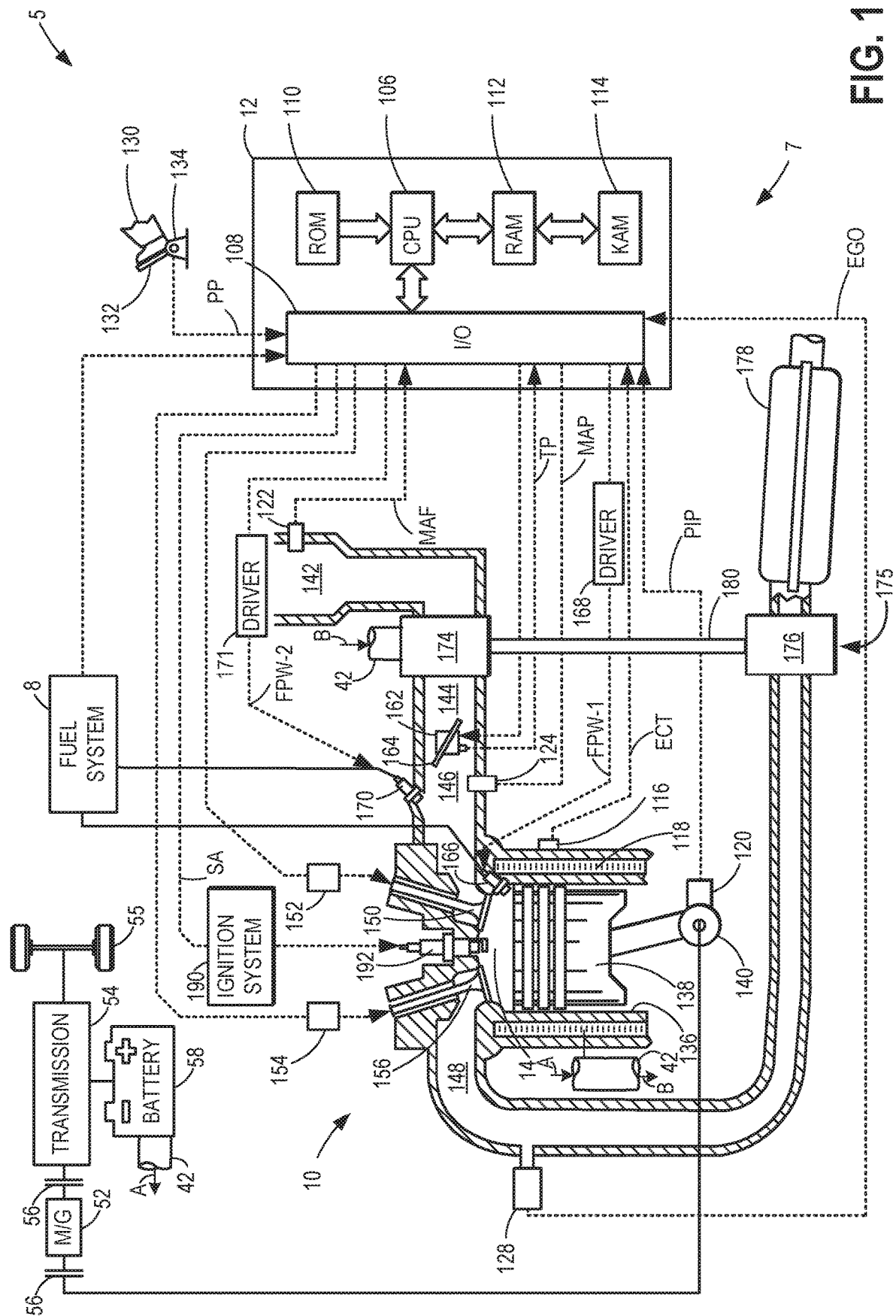
FIG. 1 shows a schematic of a hybrid engine comprising at least one cylinder.
Figure 2:
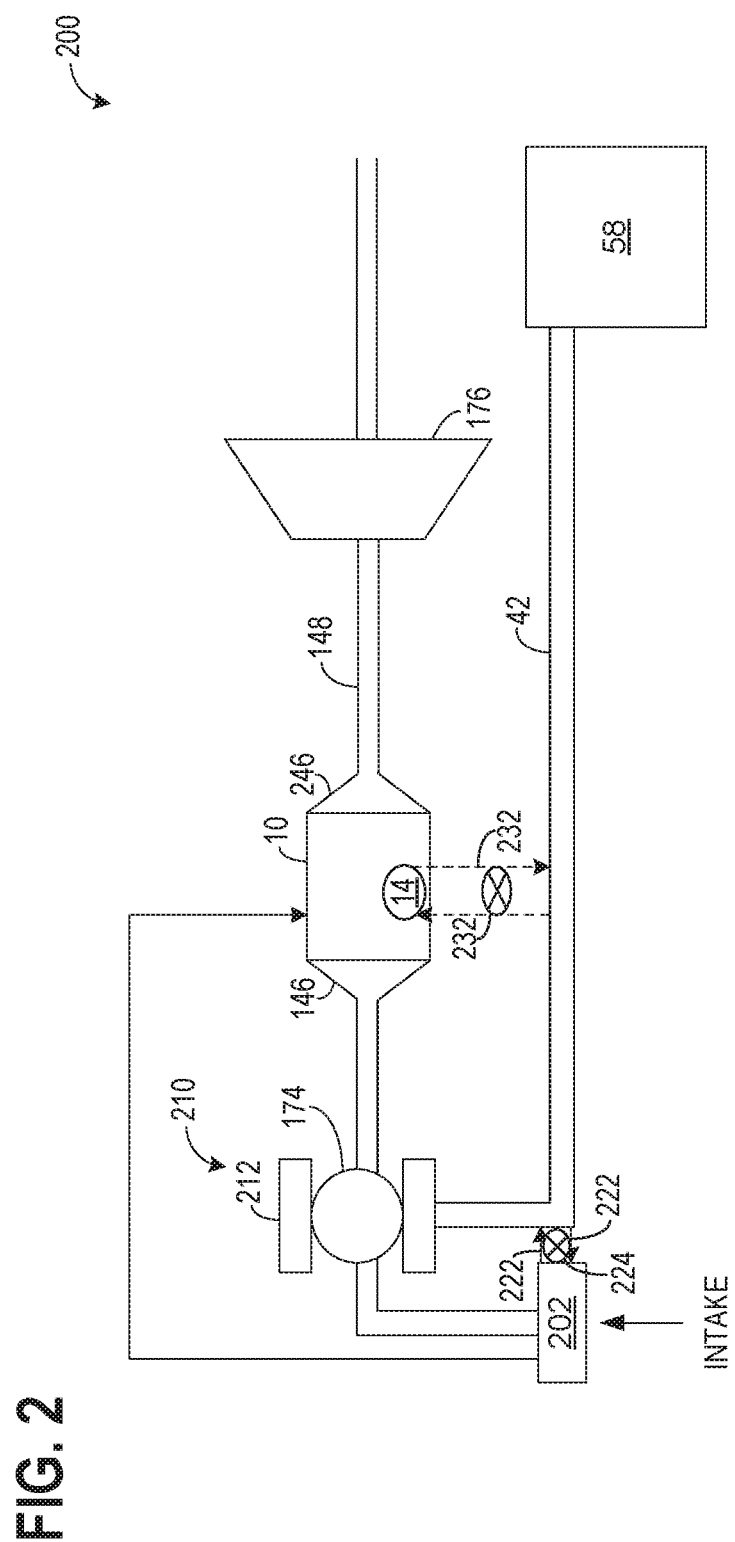
FIG. 2 illustrates a multi-cylinder engine having an electric turbocharger.
Figure 5:
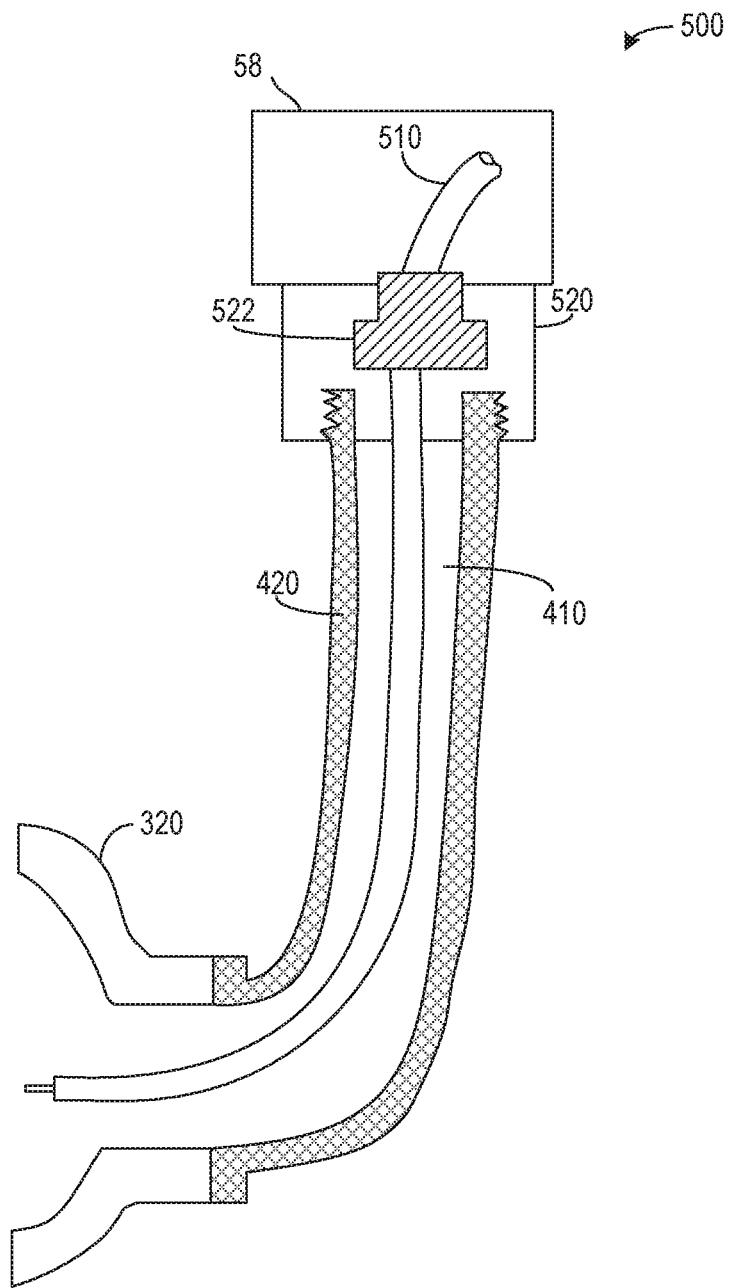
FIG. 5 shows a cross-sectional view of the conduit including the set of leads to illustrate a relationship between the coolant passages and the leads.
Figure 6:
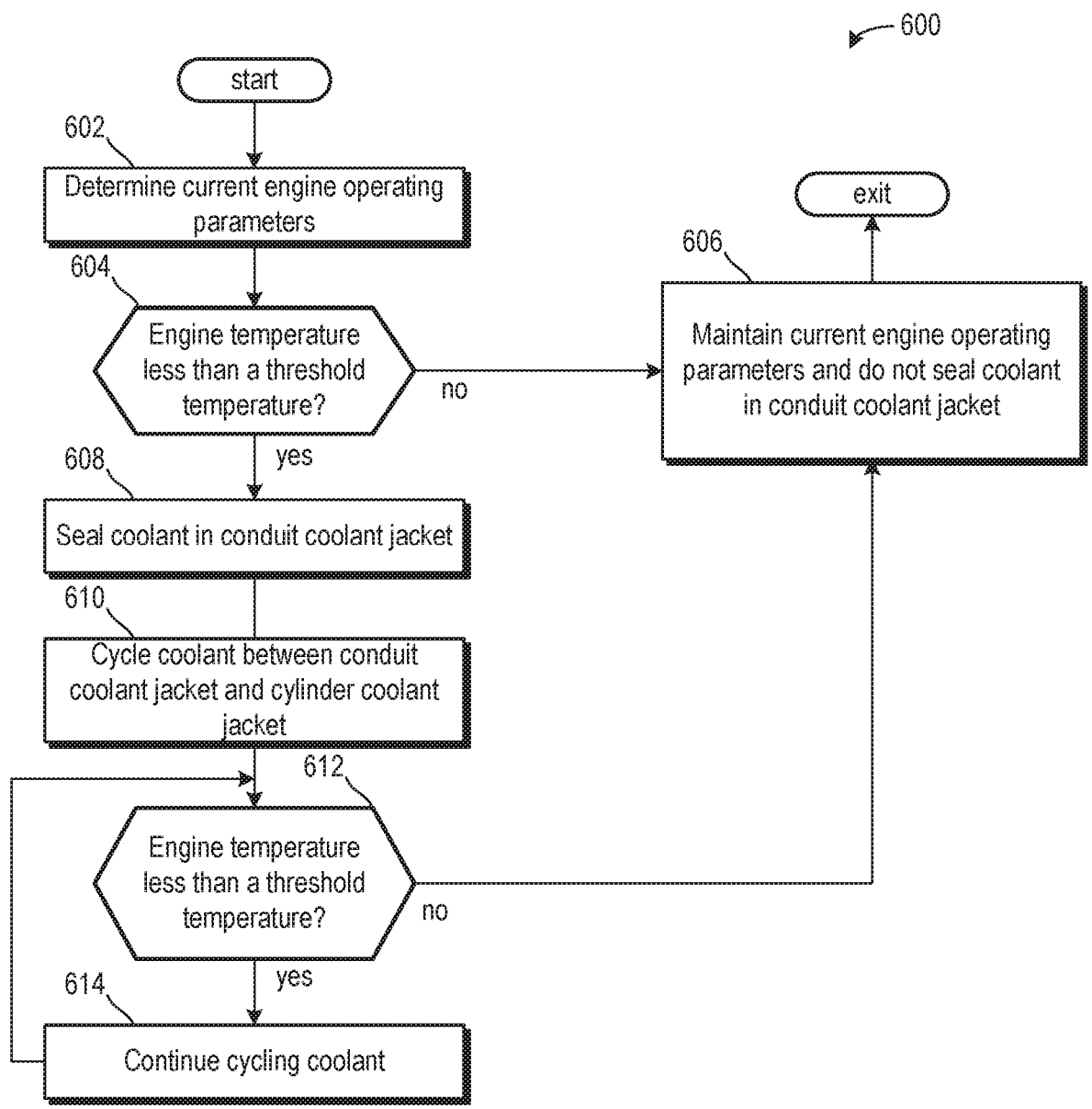
FIG. 6 shows a method for operating coolant flow through the coolant jacket of the conduit during a cold-start.

The following description relates to systems and methods for a conduit housing a set of electric leads. The conduit may further comprise a coolant jacket configured to fluidly couple to a plurality of devices also comprising coolant jackets. An engine may comprise a turbocharger and an electric turbocharger, as shown in FIGS. 1 and 2. Due to packaging constraints, leads extending from an energy storage device (e.g., a battery) may be forced to wrap around high temperature devices of the engine (e.g., a turbine and/or an exhaust manifold) to reach the electric turbocharger. As such, the coolant jacket of the conduit may function to both prevent overheating of the conduit and simplify coupling the leads to the electric turbocharger. This simplification may come about as a result of reducing one or more coolant passages due to the introduction of coolant to the electric turbocharger via the coolant jacket of the conduit. FIG. 3 illustrates an engagement between the electric turbocharger and the conduit. FIGS. 4A, 4B, and 4C illustrate various embodiments of a hollow passage and a coolant jacket of the conduit. FIG. 5 shows the set of electric leads extending through the hollow passage. FIG. 6 illustrates a method for operating coolant flow through the coolant jacket of the conduit during a cold-start.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an example of a cylinder of internal combustion engine 10 included by engine system 7 of vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. In some examples, such as the example of FIG. 2, the compressor 174 may be further powered by an electric motor, wherein the electric motor may receive power from an energy storage device (e.g., a battery 58). A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

As shown in the embodiments of FIGS. 1 and 2, a conduit 42 may extend from the battery 58 to an electric turbocharger. The electric turbocharger may comprise the compressor 174 and an electric motor (such as electric motor 212 of FIG. 2). Due to the packaging arrangement of the various engine components (e.g., the turbocharger 175, the battery 58, engine 10, and exhaust passage 148) the conduit 42 may wrap and/or snake around the exhaust side of the engine 10 as it extends toward the electric motor of the compressor 174. The direction and coupling of the conduit is shown by arrows A and arrows B. As shown, the conduit 42 extends near to the exhaust passage 148 where temperatures may be relatively high. These high temperatures may degrade a performance of one or more leads (e.g., electrical wires and in some examples a first and second wire for providing power being a power wire and a ground wire) extending from the battery 58 to the electric motor of the compressor 174. As a result, the conduit 42 may comprise at least one cooling jacket (shown in the figures below) to assist in maintaining a desired temperature of the leads. The conduit 42 and the cooling jacket are described in greater detail below.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Turning now to FIG. 2, it shows an embodiment 200 of the engine 10. As such, components previously introduced may be similarly numbered in subsequent figures. The embodiment 200 further comprises a radiator 202, an electric turbocharger 210 including an electric motor 212 coupled to the compressor 174, and an exhaust gas manifold 246.

As shown, intake air flows through a radiator prior to flowing into the compressor 174, where the intake air may be compressed. Downstream of the compressor 174, the intake air may enter the intake manifold 146, and then flow into the cylinder 14 and other cylinders of the engine 10. Following combustion, exhaust gases from the cylinder 14 and the other cylinders of the engine 10 may flow into an exhaust gas manifold 246, where the exhaust gases may mix prior to entering the exhaust passage 148. As described above, the exhaust passage 148 comprises the turbine 176 and at least one aftertreatment device (e.g., aftertreatment device 178). Although now illustrated, the embodiment 200 may further be configured with a high-pressure exhaust gas recirculation (HP-EGR) passage and/or a low-pressure exhaust gas recirculation (LP-EGR) passage.

The conduit 42 extends from the battery 58 in close proximity to each of the turbine 176 and the exhaust gas manifold 246 before interfacing with the electric motor 212 of the electric turbocharger 210. Heat from the exhaust manifold 246 and the turbine 176 may radiate toward the conduit 42, thereby increasing a temperature of the conduit 42. A set of leads (e.g., electric wires) configured to supply power from the battery 58 to the electric motor 212 during some engine conditions may be affected by the heat. For example, the heat may degrade the leads, where degradation may include melting insulation surrounding the leads.

The conduit 42 may comprise at least one coolant jacket configured to receive coolant from one or more components of the engine 10 to mitigate the thermal degradation of the leads arranged therein. Arrows 222 depict a fluidic coupling between the radiator 202 and the conduit 42. Coolant flow between the radiator 202 and the conduit 42 may be adjusted via first valve 224. Arrows 232 represent a fluidic coupling between a coolant jacket of cylinder 14 (e.g., coolant jacket 118 of FIG. 1) and the conduit 42. Coolant flow between the radiator 202 and the conduit 42 may be adjusted via second valve 234. As such, coolant from the radiator 202 and the coolant jacket of the cylinder 14 or other cylinders of the engine 10 may flow into at least one coolant jacket of the conduit 42, where the coolant may be directed to a coolant jacket of the electric turbocharger 210 or to some other coolant jacket of the engine 10. For example, the at least one coolant jacket of the conduit 42 may be further fluidly coupled to a coolant jacket of a brake system (e.g., a brake pad). Additionally or alternatively, the at least one coolant jacket of the conduit 42 may be fluidly coupled to a coolant jacket of a turbocharger (e.g., turbocharger 175 of FIG. 1).

The at least one coolant jacket of the conduit 42 and the electric turbocharger 210 will be described in greater detail below.

Turning now to FIG. 3, it shows an embodiment 300 illustrating an exploded view of a mating between the conduit 42 and the electric turbocharger 210. The electric turbocharger 210 may comprise a first gasket 310 protruding from its surface. In one example, the first gasket 310 protrudes from a surface of a bearing and/or a motor housing of the electric turbocharger 210.

The first gasket 310 further comprises a pair of boreholes 312 arranged on opposite ends of the gasket. The boreholes 312 may be each be configured to receive a bolt. Additionally or alternatively, the boreholes 312 may be at least partially threaded to allow the boreholes to receive a screw.

A coolant port 314 may be arranged on the first gasket 310. The coolant port 314 may fluidly couple a coolant jacket of the electric turbocharger 210 to a coolant passage and/or jacket of an external device. In some examples, the coolant port 314 may be divided into two separate ports, wherein a first portion of the coolant port 314 functions as an inlet and a second portion of the coolant port 314 functions as an outlet. The first portion may be hermetically sealed from the second portion such that coolant flowing into the electric turbocharger coolant jacket via the first portion does not mix with coolant flowing out of the electric turbocharger coolant jacket via the second portion.

An electrical port 316 may be arranged on the first gasket 310. The electrical port 316 may be configured to receive a set of electrical leads from the conduit 42. In one example, the electrical port 316 is sized to receive the set of electrical leads in a pigtail configuration. The electrical port 316 may direct the set of electrical leads to a conductor configured to couple to the electrical leads and receive power therefrom.

The first gasket 310 may comprise a variety of materials. In some embodiment, the gasket 310 may comprise rubber, plastic, iron, carbon fiber, magnesium, steel, or a combination thereof. In one example, the gasket 310 is elastomeric.

The conduit 42 may comprise a second gasket 320 configured to interface with the first gasket 310. When the second gasket 320 is interfaced with the first gasket 310, the two gaskets may be physically coupled to one another. As such, boreholes 322 of the second gasket 320 may align with boreholes 312 of the first gasket 310, wherein a fastener (e.g., a screw or bolt) may extend therethrough. Additionally or alternatively, the first 310 and second 320 gaskets may be physically coupled via adhesives, welds, fusions, and the like.

The second gasket 320 may further comprise a coolant port shaped similarly to the coolant port 314 of the first gasket 310. The coolant port of the second gasket 320 may further comprise inlets and outlet similar to the inlets and outlets of the coolant port 314 to assist in adjusting coolant flow to and from a coolant jacket of the electric turbocharger 210.

The second gasket 320 may further comprise an electrical port similar to the electric port 316 of the first gasket 310. As such, the set of electric leads extending through the conduit 42 in a pigtail configuration may extend through the electric port of the second gasket 320 before extending through the electric port 316 and coupling to a conductor of the electric turbocharger 210.

The second gasket 320 may comprise a variety of materials. In one example, the second gasket 320 comprises a material identical to a material of the first gasket 310. Alternatively, the material of the second gasket 320 may be different than the material of the first gasket 310.

The conduit 42 may be physically coupled to the second gasket 320 via one or more fasteners, welds, fusions, adhesives, and the like. The conduit 42 may comprise openings similar to the coolant port 314 and the electrical port 316. In this way, the coolant jacket of the conduit 42 may fluidly communicate with the coolant jacket of the electric turbocharger 210 via the coolant ports, without allowing the coolant to contact the electrical leads extending from the conduit 42, through the electrical ports, and to the conductor of the electrical turbocharger 210.

A coolant connection 350 is shown coupled to the conduit 42. The coolant port 350 may be configured to flow coolant toward a coolant jacket of the conduit 42. Additionally or alternatively, the coolant port 350 may be configured to flow coolant out of the coolant jacket of the conduit 42 to a different coolant system of an engine (e.g., engine 10 of FIGS. 1 and 2. For example, the coolant connection 350 may be configured to adjust coolant flow between the coolant jacket of the conduit 42 and a radiator (e.g., radiator 202 of FIG. 2).

Turning now to FIG. 4A, it shows an embodiment 400 of the conduit 42. The conduit 42 comprises a hollow passage 410, which may extend through an entire length of the conduit 42. The hollow passage 410 may house the set of electric leads. A coolant jacket 420 may circumferentially surround the hollow passage 410. An inner surface 432 may be arranged between the coolant jacket 420 and the hollow passage 410. In this way, coolant from the coolant jacket 420 may not flow into the hollow passage 410, thereby prevent direct interactions between the coolant and the electric leads.

An outer surface 434 may be radially spaced away from the inner surface 432 and may define a volume of the coolant jacket 420. Thus, a circumference of the outer surface 434 may be greater than a circumference of the inner surface 432. Additionally or alternatively, there may be no further inlets or additional outlets in the outer surface 434 other than the coolant connection (e.g., coolant connection 350 of FIG. 3). Thus, coolant in the coolant jacket 420 may not flow to an ambient atmosphere or to the hollow passage 410. The coolant port of the second gasket 320 of FIG. 3 may be fluidly coupled to the coolant jacket 420, in some embodiments.

The outer surface 434 and the inner surface 432 may comprise one or more materials, including but not limited to steel, plastic, carbon fiber, magnesium, iron, metallic, and the like. The outer surface 434 and the inner surface 434 may be substantially cylindrical in shape and have a circular cross-section. The outer surface 434 and the inner surface 432 may comprise one or more bends or turns as the conduit 42 extends from a battery (e.g., battery 58 of FIGS. 1 and 2) to the electric turbocharger (e.g., electric turbocharger 210 of FIG. 2).

Turning now to FIG. 4B, it shows an embodiment 450 of the hollow passage 410 and the coolant jacket 420. Specifically, the hollow passage 410 may be separated from the coolant passage 420 via a first insulated portion 440. The first insulated portion 440 may be a double-walled surface comprise a first inner wall 442 and a second inner wall 444. The first inner wall 442 may be radially interior to the second inner wall 444, wherein the first inner wall 442 may be in contact with the hollow passage 410. Thus, the second inner wall 444 may be in contact with coolant in the coolant jacket 420. The first inner wall 442 and the second inner wall 444 may be spaced away from one another to define a volume of the first insulation portion 440. Vacuum, air, liquid, or the like may fill the first insulated portion 440, thereby providing some thermal separation between the hollow passage 410 and the coolant jacket 420. In one example, the first insulated portion 440 decreases heat transfer between the coolant in the coolant jacket 420 and electric leads in the hollow passage 410.

Additionally, the coolant jacket 420 may comprise a second insulated portion 460, wherein the second insulated portion may comprise a first outer wall 462 and a second outer wall 464. The first outer wall 462 may be radially interior to and spaced away from the second outer wall 464, thereby defining a volume of the second insulated portion 460. Vacuum, air, liquid, and/or the like may fill the second insulated portion 460. In some examples, a volume and a filling of the second insulated portion 460 may be substantially identical to a volume and filling of the first insulated portion 440.

Each of the first inner wall 442, the second inner wall 444, the first outer wall 462, and the second outer wall 464 may comprise various materials, including but not limited to one or more of steel, iron, plastic, carbon fiber, magnesium, and the like.

The coolant jacket 420 may be arranged between the second inner wall 444 and the first outer wall 462. Thus, the second insulated portion 460 may be configured to decrease thermal transfer between the coolant jacket 420 and exhaust gas devices positioned near the conduit (e.g., exhaust gas manifold 246 and turbine 174 of FIG. 2). It will be appreciated that the sizes of the first and second insulated portions may be adjusted based on a desired thermal transfer characteristic. For example, it may be desired to decrease a volume of or entirely omit the second insulated portion 460 to allow coolant in the coolant jacket 420 to receive heat from the exhaust gas devices during some engine operating conditions (e.g., a cold-start). Therefore, in some embodiments, the first insulated portion 440 may be the only insulated portion or may be larger than the second insulated portion 460. By making an insulated portion larger, the portion may be more insulating and thereby less heat may transfer between two areas.

Turning now to FIG. 4C, it shows an embodiment 475 of the conduit 42. The embodiment 475 may be substantially identical to the embodiment 400 of FIG. 4A, except for that the coolant jacket 420 is separated into two portions (the separation not shown in FIGS. 4A-C), including a first portion 482A and a second portion 482B. The first portion 482A may correspond to a coolant inlet of the conduit 42, while the second portion 482B may correspond to a coolant outlet of the conduit 42 relative to the coolant connection 350. As such, the first portion 482A may be further configured to deliver coolant to the coolant jacket of the electric turbocharger. The second portion 482B may be configured to receive coolant from the coolant jacket of the electric turbocharger. In one example, the coolant jacket of the electric turbocharger only receives coolant from and delivers coolant to the coolant jacket 420. In this way, the reduction of coolant passages leading to and from the electric turbocharger may decrease crowding around the electric turbocharger, thereby decreasing packaging constraints and decreasing a difficulty when coupling the second gasket to the first gasket (e.g., second gasket 320 and first gasket 310 of FIG. 3). Additionally or alternatively, the electric turbocharger coolant jacket may only receive coolant from the conduit coolant jacket, but, the electric turbocharger coolant jacket may flow coolant to destinations other than the conduit coolant jacket (e.g., the radiator). Additionally or alternatively, in some embodiments, the electric turbocharger may receive coolant from and send coolant to the conduit coolant jacket and other coolant sources of the engine.

Turning now to FIG. 5, it shows a cross-section 500 of the conduit 42. The cross-section 500 exposes a set of electric leads 510 extending through the hollow passage 410 of the conduit 42. The electric leads 510 may extend from the battery 58, wherein the electric leads 510 enter the hollow passage 410 via a seal 522 arranged in an adapter 520. The seal may be prevent water, debris, and the like from entering the hollow passage 410 and contacting the electric leads 510. In one example, the adapter 520 is an elastomeric bushing compressed by a nut. The conduit 42 may comprise one or more flexible features to allow the surfaces of the conduit 42 to bend and/or twist around one or more engine components to enable an assembly worker to easily couple the second gasket 320 to a first gasket of an electric turbocharger (e.g., first gasket 310 and electric turbocharger 210 of FIG. 3). The electric leads 510 may be in a long pigtail configuration, wherein individual leads of the electric leads are braided together as they pass through the hollow passage 410.

Turning now to FIG. 6, it shows a method 600 of the conduit 42. Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 600 begins at 602, where the method 600 may include determining, estimating, and/or measuring current engine operating parameters. Current engine operating parameters may include, but are not limited to, one or more of throttle position, engine temperature, engine speed, manifold pressure, vehicle speed, exhaust gas recirculation flow rate, and air/fuel ratio.

At 604, the method 600 may include determining if an engine temperature is less than a threshold temperature. The threshold temperature may be based on an ambient temperature or a desired engine operating temperature. The engine temperature may be estimated based on feedback from a temperature sensor arranged in a cylinder coolant jacket, in an exhaust passage, or the like.

If the engine temperature is not less than the threshold temperature, then the method 600 may proceed to 606 to maintain current engine operating parameters and does not seal coolant in the conduit coolant jacket. Furthermore, coolant in the conduit coolant jacket may be directed to the coolant jacket of the electric turbocharger when cooling of the electric turbocharger is desired (e.g., during a tip-in).

If the engine temperature is less than the threshold temperature, then the method 600 may proceed to 608 to seal coolant in the conduit coolant jacket. Sealing coolant in the conduit coolant jacket may include filling at least one of the conduit coolant jackets with coolant and not flowing the coolant to the electric turbocharger. Additionally or alternatively, the coolant in the conduit coolant jacket may not flow to the radiator, the cylinder coolant jacket, and/or the like. As such, the conduit coolant jacket may be fluidly sealed when coolant is held therein during a cold-start (e.g., when the engine temperature is less than the threshold temperature).

By doing this, high temperatures from exhaust gas devices may heat the coolant held in the conduit coolant jacket. In one example, a valve may be arranged between the conduit coolant jacket and the electric turbocharger coolant jacket, wherein the valve is switched to a closed position when coolant is held in the conduit coolant jacket.

At 610, the method 600 may include cycling the coolant in the conduit coolant jacket with coolant in the cylinder coolant jacket. By doing this, the hot coolant from the conduit coolant jacket may mix with cooler coolant in the cylinder coolant jacket. In some embodiments, the method may begin cycling coolant after a threshold duration (e.g., 5 seconds). In some embodiments, additionally or alternatively, the method may begin cycling coolant after a threshold number of cylinder combustions (e.g., 5). The cycling may be adjusted via a valve (e.g., second valve 234 of FIG. 2). The valve 234 may oscillate between open and closed positions to perform the cycling.

At 612, the method 600 include determining if the engine temperature is still less than the threshold temperature. If the engine temperature is not less than the threshold temperature, then the method 600 may proceed to 606. If the engine temperature is less than the threshold temperature, then the method continues to 614 to continue cycling coolant.

In some examples, if there is an electric boost demand during the cold start, then the method may optionally include flowing at least some of the coolant held in the conduit coolant jacket to the electric turbocharger coolant jacket. An amount of coolant sent to the electric turbocharger during the cold-start may be less than an amount of coolant sent to the electric turbocharger during engine operating conditions where the engine temperature is greater than or equal to the threshold temperature.

In this way, a flexible conduit may chaperone a set of electrical leads from an energy storage device to an electric turbocharger. The conduit may further comprise at least one coolant jacket for maintaining a temperature of the electrical leads and preventing thermal degradation of the leads. The technical effect of incorporating at least one coolant jacket into the conduit is to protect the electrical leads and to provide coolant to the electric turbocharger. By doing this, a number of coolant hoses feeding coolant to the electric turbocharger may be reduced thereby decreasing packaging constraints and simplifying manufacturing.

A system comprising an electric turbocharger housing comprising at least an electric motor, and where the electric turbocharger receives and expels coolant via first and second passages housed within a conduit, the first and second passages surrounding a set of leads extending through the conduit to the electric turbocharger. A first example of the system further includes where conduit wraps around a turbine or an exhaust manifold. A second example of the system, optionally including the first example, further includes where the set of leads is arranged in a hollow passage of the conduit, and where the first and second passages are fluidly separated from the hollow passage. A third example of the system, optionally including the first and/or second examples, further includes where the first and second passages are fluidly coupled to a cylinder coolant jacket. A fourth example of the system, optionally including one or more of the first through third examples, further includes where the first and second passages are fluidly coupled to a radiator. A fifth example of the system, optionally including one or more of the first through fourth examples, further includes where the conduit is flexible. A sixth example of the system, optionally including one or more of the first through fifth examples, further includes where the conduit comprises an elastomeric adaptor for engaging with an energy storage device. A seventh example of the system, optionally including one or more of the first through sixth examples, further includes where the elastomeric adaptor seals with the conduit and the energy storage device to prevent water entry therebetween. An eighth example of the system, optionally including one or more of the first through seventh examples, further includes where the electric turbocharger comprises a first gasket and the conduit comprises a second gasket, configured to mate with the first gasket, and where the first and second gaskets comprise coolant ports and electrical ports, the coolant ports configured to adjust coolant flow between the electric turbocharger and the first and second passages, and where the electric ports are configured to direct the set of leads from the conduit to a conductor of the electric turbocharger, and where the coolant does not contact the set of leads at the gaskets.

A method comprising sealing coolant in a conduit coolant jacket of a conduit, where the conduit houses a set of electric leads extending from an energy storage device to an electric turbocharger and cycling coolant in the conduit coolant jacket with coolant in a cylinder coolant jacket in response to an engine cold-start. A first example of the method further includes where the cycling begins a threshold duration following the sealing. A second example of the method, optionally including the first example, further includes where the cycling begins following a threshold number of combustions following the sealing. A third example of the method, optionally including the first and/or second examples, further includes where the sealing includes preventing coolant from flowing from the conduit coolant jacket to a coolant jacket of the electric turbocharger. A fourth example of the method, optionally including one or more of the first through third examples, further includes where the conduit coolant jacket is the only source of coolant for a coolant jacket of the electric turbocharger. A fifth example of the method, optionally including one or more of the first through fourth examples, further includes where the conduit coolant jacket flow coolant to coolant jacket of the electric turbocharger outside of the engine cold-start.

A system comprising an electric turbocharger comprising a compressor coupled to an electric motor, an energy storage device configured to supply power to the electric motor via a set of leads, and a conduit housing the set of leads and extending from the energy storage device to the electric motor, the conduit further comprising at least one coolant jacket in fluid communication with an electric turbocharger coolant jacket. A first example of the system further includes where the at least one coolant jacket comprises a first portion configured to supply coolant to the electric turbocharger coolant jacket, and a second portion configured to receive coolant from the electric turbocharger coolant jacket, wherein the first and second portions are sealed from one another, wherein the leads electrically couple the supply to the motor to provide driving current and capture regenerative motor braking current. A second example of the system optionally includes where the at least one coolant jacket surrounds a hollow passage through which the set of leads extend. A third example of the system optionally including the first and/or second examples, further includes where the conduit is metallic. A fourth example of the system, optionally including one or more of the first through third examples, further includes where the electric turbocharger and the conduit comprise a elastomeric gaskets configured to couple to one another.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
an electric turbocharger housing comprising at least an electric motor, and where an electric turbocharger receives and expels coolant via first passage and second passages housed within a conduit, the first passage and second passage surrounding a set of electric wires extending through the conduit to the electric turbocharger, wherein the set of electric wires is arranged in a third, hollow, passage of the conduit, and where the first and second passages are fluidly separated from the third passage.

2. The system of claim 1, wherein the conduit wraps around a turbine or an exhaust manifold.

3. The system of claim 1, wherein the first passage is fluidly coupled to a cylinder coolant jacket.

4. The system of claim 1, wherein the first passage is fluidly coupled to a radiator.

5. The system of claim 1, wherein the conduit is flexible.

6. The system of claim 1, wherein the conduit comprises an elastomeric adaptor for engaging with an energy storage device.

7. The system of claim 6, wherein the elastomeric adaptor seals with the conduit and the energy storage device to prevent water entry therebetween.

8. The system of claim 1, wherein the electric turbocharger comprises a first gasket and the conduit comprises a second gasket, configured to mate with the first gasket, and where the first and second gaskets comprise coolant ports and electrical ports, the coolant ports configured to adjust coolant flow between the electric turbocharger and the first and second passages, and where the electric ports are configured to direct the set of electric wires from the conduit to a conductor of the electric turbocharger, and where the coolant does not contact the set of electric wires at the first and second gaskets.

9. A system comprising:
an electric turbocharger comprising a compressor coupled to an electric motor;
an energy storage device configured to supply power to the electric motor via a set of electric wires; and
a conduit housing the set of electric wires and extending from the energy storage device to the electric motor, the conduit further comprising at least one coolant jacket in fluid communication with an electric turbocharger coolant jacket.

10. The system of claim 9, wherein the at least one coolant jacket comprises a first portion configured to supply coolant to the electric turbocharger coolant jacket, and a second portion configured to receive coolant from the electric turbocharger coolant jacket, wherein the first and second portions are sealed from one another, wherein the electric wires electrically couple the supply to the electric motor to provide driving current and capture regenerative motor braking current.

11. The system of claim 9, wherein the at least one coolant jacket surrounds a hollow passage through which the set of electric wires extend.

12. The system of claim 9, wherein the conduit is metallic.

13. The system of claim 9, wherein the electric turbocharger and the conduit comprise elastomeric gaskets configured to couple to one another.

* * * * *